United States Patent [19]
Tomizawa

[11] Patent Number: 6,088,137
[45] Date of Patent: Jul. 11, 2000

[54] SPECIFIED IMAGE-AREA EXTRACTING METHOD AND DEVICE

[75] Inventor: Naoki Tomizawa, Chiba, Japan

[73] Assignee: Sharp Kabushiki Kaisha, Osaka, Japan

[21] Appl. No.: 08/690,319

[22] Filed: Jul. 25, 1996

[30] Foreign Application Priority Data

Jul. 28, 1995 [JP] Japan ..................................... 7-193870

[51] Int. Cl.$^7$ ................. H04N 1/46; G03F 3/08
[52] U.S. Cl. .................. 358/538; 358/538; 358/528; 358/523; 358/522; 358/520
[58] Field of Search ..................... 358/520, 522, 358/523, 528, 538; 382/118, 190, 165; 348/652, 592, 577, 169, 29, 30

[56] References Cited

U.S. PATENT DOCUMENTS

| | | | |
|---|---|---|---|
| 5,296,945 | 3/1994 | Nishikawa et al. | 358/520 |
| 5,680,230 | 10/1997 | Kaburagi | 358/520 |
| 5,729,295 | 3/1998 | Okada | 348/416 |

FOREIGN PATENT DOCUMENTS

| | | |
|---|---|---|
| 0 514933 | 11/1992 | European Pat. Off. . |
| 0 654 749 A2 | 11/1994 | European Pat. Off. ......... G06K 9/00 |
| 0 654749 | 5/1995 | European Pat. Off. . |
| 63223974 | 9/1969 | Japan . |
| 4-346332 | 12/1992 | Japan . |
| 4-346333 | 12/1992 | Japan . |
| 4-346334 | 12/1992 | Japan . |
| 5-100328 | 4/1993 | Japan . |
| 5-158164 | 6/1993 | Japan . |
| 5-165120 | 6/1993 | Japan . |
| 6-44365 | 2/1994 | Japan . |
| 6-67320 | 3/1994 | Japan . |
| 6-160993 | 6/1994 | Japan . |

*Primary Examiner*—Edward L. Coles
*Assistant Examiner*—Twyler Lamb

[57] ABSTRACT

A face (skin color) area of a person is extracted with minimized error irrespective of different skin colors of the human races. A hue value calculating portion determines a hue value from an input image (RGB signal). A primary discriminating portion extracts pixels having hue value that lies in a specified range defined by limiting values outputted from a control portion. A pixel-counting portion counts the extracted pixels. The control portion selects a threshold value for extracting a face area according to the count of the extracted pixels and outputs the threshold value to a face-area extracting portion which in turn extracts a face area according to the threshold value.

19 Claims, 10 Drawing Sheets

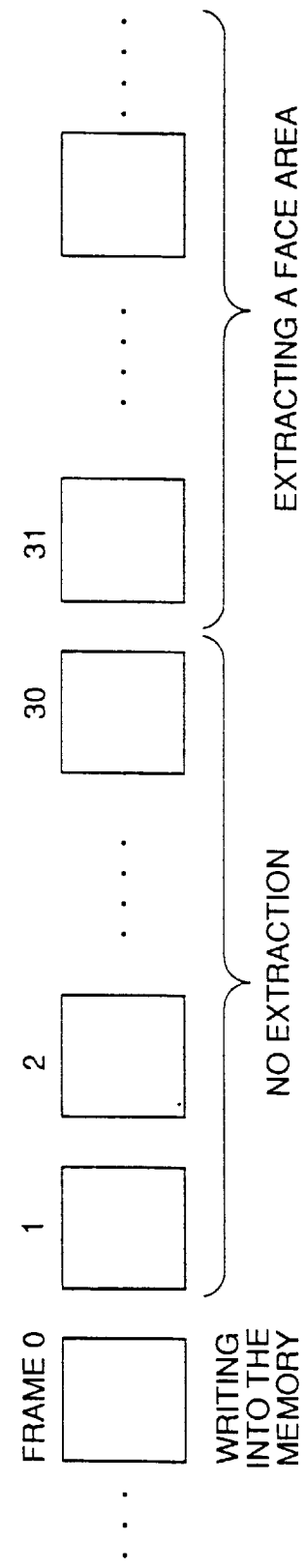

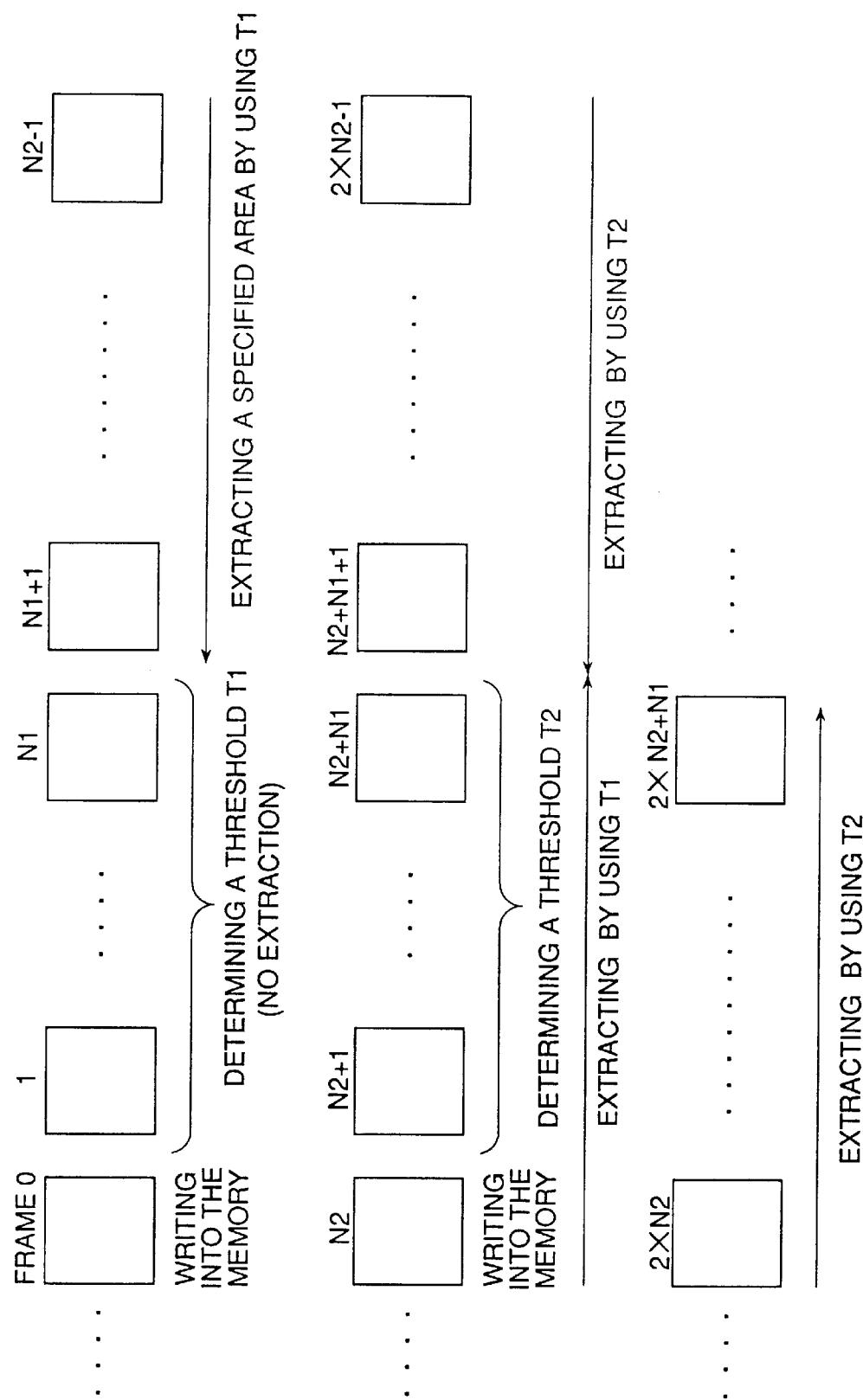

SPECIFIED IMAGE-AREA EXTRACTING METHOD AND DEVICE

BACKGROUND OF THE INVENTION

The present invention relates to a specified image-area extracting method and a specified image-area extracting device, and more particularly, to a method of and a device for extracting, from an input image, a remarkable portion, e.g., a person's skin-color portion including their face, arms and the like as a specified image-area, which method and device are usable for a video processing device, e.g., for producing video information suitable to use in video telephones and video conferences.

Up to now, face-area extraction by detecting a location of a face of a human figure in an input image and processing the detected area with priority has been proposed as an effective method to improve the quality of a video image. It is easily understood that a face portion is remarkable in an image displayed on a display screen of, e.g., a video telephone or a video conference apparatus in the field of video communication. It is, therefore, preferred to extract a face area from an image and suitably encode and quantize the extracted face area to improve the image quality.

Japanese Laid-Open Patent Publication No. 5-165120, which is referred to as a first example of a conventional face-area extracting method, discloses sequential steps of a face-area extracting process according to a featured image-data extracting method. In a first Step, noise components are removed from input data R, G, B. In the second Step, data R, G and B are converted to an H (hue) value, an S (saturation) value and an L (luminance) value. In the third Step, a two-dimensional histogram showing hue value and saturation value is prepared by using a coordinate system with orthogonal axes for hue value (H), saturation value (S) and the number of pixels. In the fourth Step, the determined two-dimensional histogram is clustered by cutting-out small peaks therefrom by a plane parallel to the coordinate plane and detecting small peaks. In the fifth Step, a large number of pixels are clustered on the basis of the detected small peaks cut-out from the two-dimensional histogram, and surrounding pixels are integrated together to form an integrated area. The input image scene (frame) is divided into areas according to the integrated area. Prospective areas of a person's face are extracted from the divided image. In the sixth Step, face areas are estimated from the extracted prospective face areas, and then data sets R, G and B for estimated face areas are outputted.

Similar techniques for determining the above-mentioned two-dimensional histogram of parameters H and S and dividing and extracting peaks corresponding to respective areas of an image are also proposed in Japanese Laid-Open Patent Publication Nos. 6-160993, 6-67320, 5-158164, 5-100328, 4-346334, 4-346333 and 4-346332. Another (second) example of a conventional area-extracting method is as follows:

A two-dimensional histogram is plotted for color difference values U and V, where a face area is included in a respective area. Therefore, the respective area is extracted and outputted as a face area. The above-mentioned processing is conducted on all video frames.

The first example of a conventional face-area extraction method divides an input image into areas by first preparing a two-dimensional histogram of hue and luminance and then extracting a peak of histogram frequencies (the number of pixels). This method, however, encounters such a problem that it is rather difficult to decide what peak corresponds to a skin color area: in practice, the white race and the black race have different hue values, i.e., erroneous face-area extraction may arise depending upon the different races.

The second example of a conventional face-area extracting method involves the following problem:

Face areas of all races can not be limited to two kinds of color difference distributions and are of at least three kinds of color difference (the white race, the black race and the yellow race) because the color difference has a close correlation with luminance (brightness). Accordingly, this method can not extract a face area depending upon the race. When the method is applied to video processing, a color space of all pixels in each frame must be transformed by performing a large number of time-consuming operations.

SUMMARY OF THE INVENTION

In view of the foregoing problems of conventional face-area extracting, the present invention was made to provide a skin-color-area extracting method that is capable of correctly extracting a skin-color area with no error and with a minimized amount of processing operations.

To solve the above-mentioned problems, the present invention provides the following methods and devices:

(1) A specified image-area extracting method is to derive a value of a color component having a low correlation with luminance from each of pixels composing an input colored image, determine distributions of all pixels of the input image against each color component value, decide a specified area of each color component value on the basis of the determined distributions and extract pixels whose color component value lies within the specified range. This method can accurately extract a face area of a person in an image with a minimized influence of illuminating conditions, skin color difference of the races and variation of skin colors.

(2) A specified area extracting method, which relates to the invention of the above (1), is further featured by using hue values as the color component. This feature is effective to use in practice of extracting a specified-image-area.

(3) A specified area extracting method, which relates to the invention of the above (1) or (2), determines distributions of pixels relative to the color component values by preparing a histogram of the color component values, examines whether a peak frequency exceeds a preset value in a preset range of the color component values and selects two presetable specified areas on the basis of the examination result. This feature is effective to use in practice for extracting a specified image-area from an input image.

(4) A specified area extracting method, which relates to the above (3), is characterized in that the presetable specified range of the color component values is limited by a fixed upper limit value and a fixed lower limit value to simplify the processing.

(5) A specified area extracting device comprises an arithmetic processor for calculating a color component value having a low correlation with luminance for each pixel in an input colored image, a frame memory for storing the input colored image and the color component value determined by the arithmetic processor, a discriminator for discriminating whether the determined color component value is included within a specified preset range of color components values, a counter for counting-up pixels having color component value within the specified range according to the discrimination result, specified image-area extractor for extracting an image within the selected range of color component values read from the frame memory and a controller for performing control of the above-mentioned elements and calculating operations, said controller being provided with facilities for comparing a value counted-up by the counter to a preset value and for selecting two specified areas of the color component by the specified image-area extractor. This device is effective to use in practice for extracting a specified image-area from an input image.

(6) A specified area extracting device, which relates to the above (5), is characterized in that an upper limit value and a lower limit value limiting the predetermined range of color component values are constant values to simplify the processing.

(7) A specified area extracting device comprises a frame memory for storing an input colored image, a pixel extractor for deriving a color component value having a low correlation with luminance for each pixel of the input image stored in the frame memory, determining distributions of all pixels of the input image according to the color component values, determining a specified area of the color component values on the basis of the distributions and extracting pixels belonging to the determined specified area, a first element for preparing a histogram of the extracted image pixels in an input color-space, a second element for determining a specified area in the input color-space from the distribution of the determined histogram, third element for applying the determined specified image area to an input image of a proceeding frame and extracting pixels belonging to the determined specified area from the input image, and control means for controlling the above-mentioned means and calculations. This device can extract pixels belonging to a specified area according to a histogram in a color space of an input original image at an increased processing rate and therefore is suitable to process images in which a person always exists and will not be altered by another.

(8) A specified area extracting device, which relates to the above (7), is characterized in that the controller periodically conducts determination of the specified area in a color space, repeatedly applies the specified area determined in the color space to images to be inputted until a new specified area is defined, and extracts pixels belonging to the specified area. This device can therefore work with a sequence of frames in which a person is altered by another.

(9) A specified area extracting device, which relates to any one of the above (7) and (8), is characterized in that it has a facility adapted to process an image sequence to be used as the input colored image. This device can be effectively used for processing a sequence of video frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 11 is a view for explaining an embodiment of FIG. 10.

FIG. 12 is a view for explaining an embodiment of FIG. 10.

PREFERRED EMBODIMENTS OF THE INVENTION

Face-area extraction by detecting a location of a face of a human figure in an input image and processing the detected area with priority has been proposed as an effective method to improve the quality of a video image. It is easily understood that a face portion is remarkable in an image displayed on a display screen of, e.g., a video telephone or a video conference apparatus in the field of video communication. It is, therefore, preferred to extract a face area from an image and suitably encode and quantize the extracted face area to improve the image quality.

Figure 1:
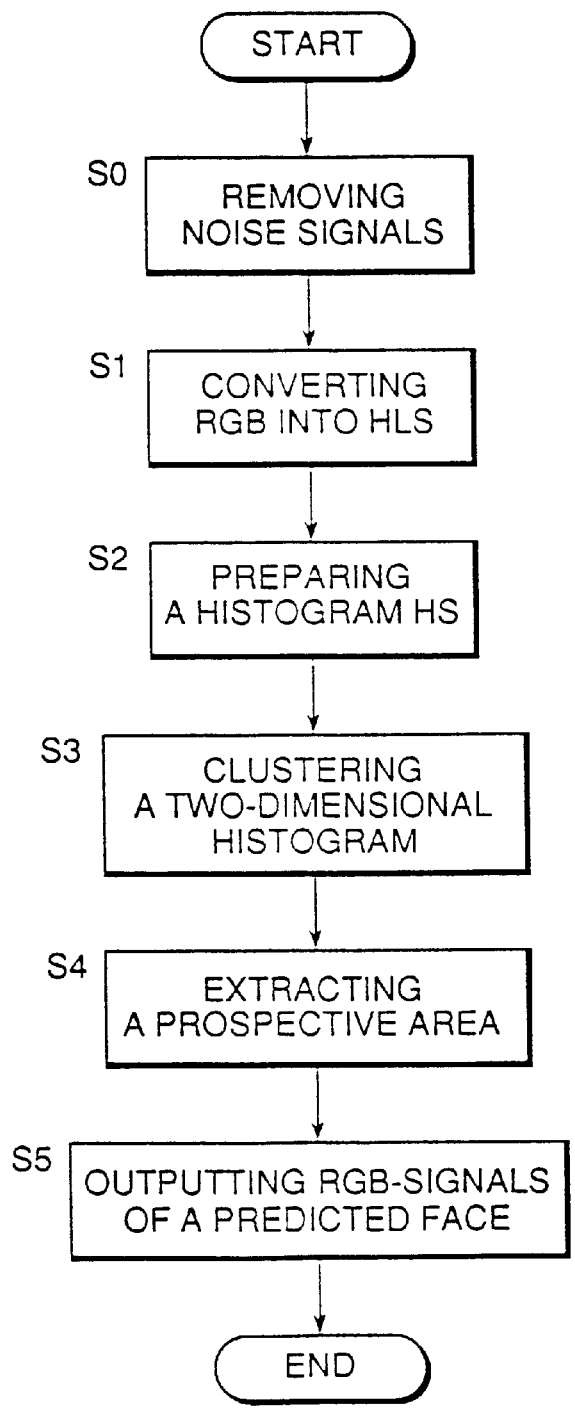
FIG. 1 is a flow chart for explaining a conventional face-area extracting method.
Figure 2:
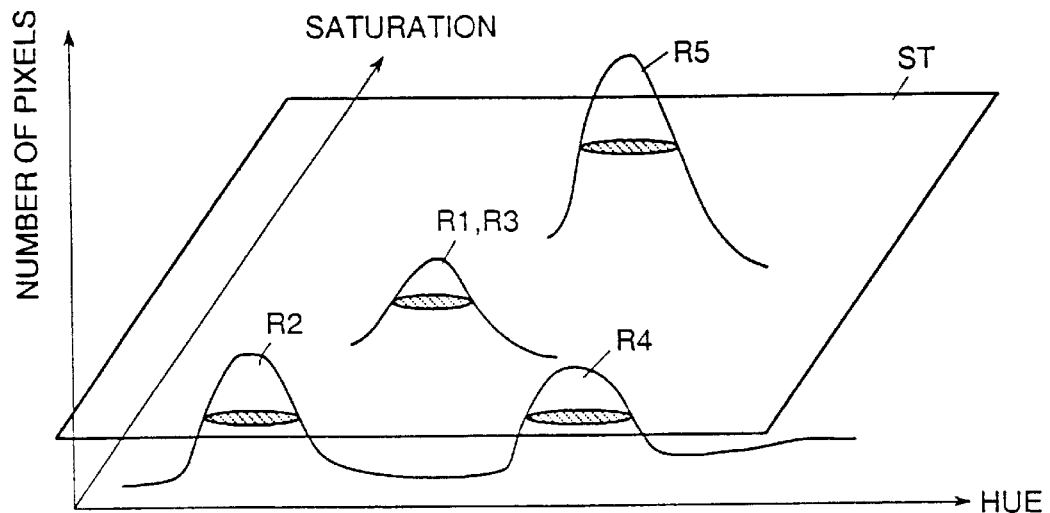
FIG. 2 is a graph showing a two-dimensional histogram of hue and luminance of an input image according to a conventional face-area extracting method.
Figure 3:
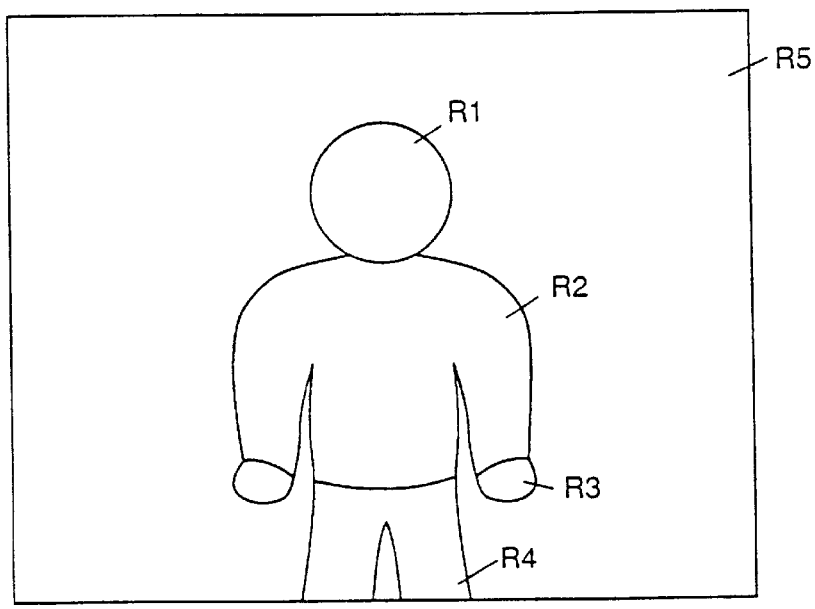
FIG. 3 is a graph showing how to divide an input image into areas according to a conventional face-area extracting method.

FIG. 1 is a flow chart showing sequential steps of a face-area extracting process according to a featured image-data extracting method described in Japanese Laid-Open Patent Publication No. 5-165120, which is referred to as a first example of conventional face-area extracting method. At Step S0, noise components are cleared from input data R, G, B. At Step S1, data R, G and B are converted to an H (hue) value, an S (saturation) value and an L (luminance) value. At Step S2, a two-dimensional histogram showing hue value and saturation value is prepared by using a coordinate system with orthogonal axes for hue value (H), saturation value (S) and the number of pixels as shown in FIG. 2. At Step S3, the determined two-dimensional histogram is clustered by cutting-out small peaks therefrom by a plane ST parallel to the coordinate plane and detecting small peaks. At Step S4, a large number of pixels are clustered on the basis of the detected small peaks cut-out from the two-dimensional histogram, and surrounding pixels are integrated together to form an integrated area. The input image scene (frame) is divided into areas according to the integrated area. Prospective areas R1 and R3 of a person's face are extracted from the divided image. At Step S5, face areas R1 and R3 (see FIG. 3) are estimated from the extracted prospective face areas, and then data sets R, G and B for estimated face areas are outputted.

Figure 4:
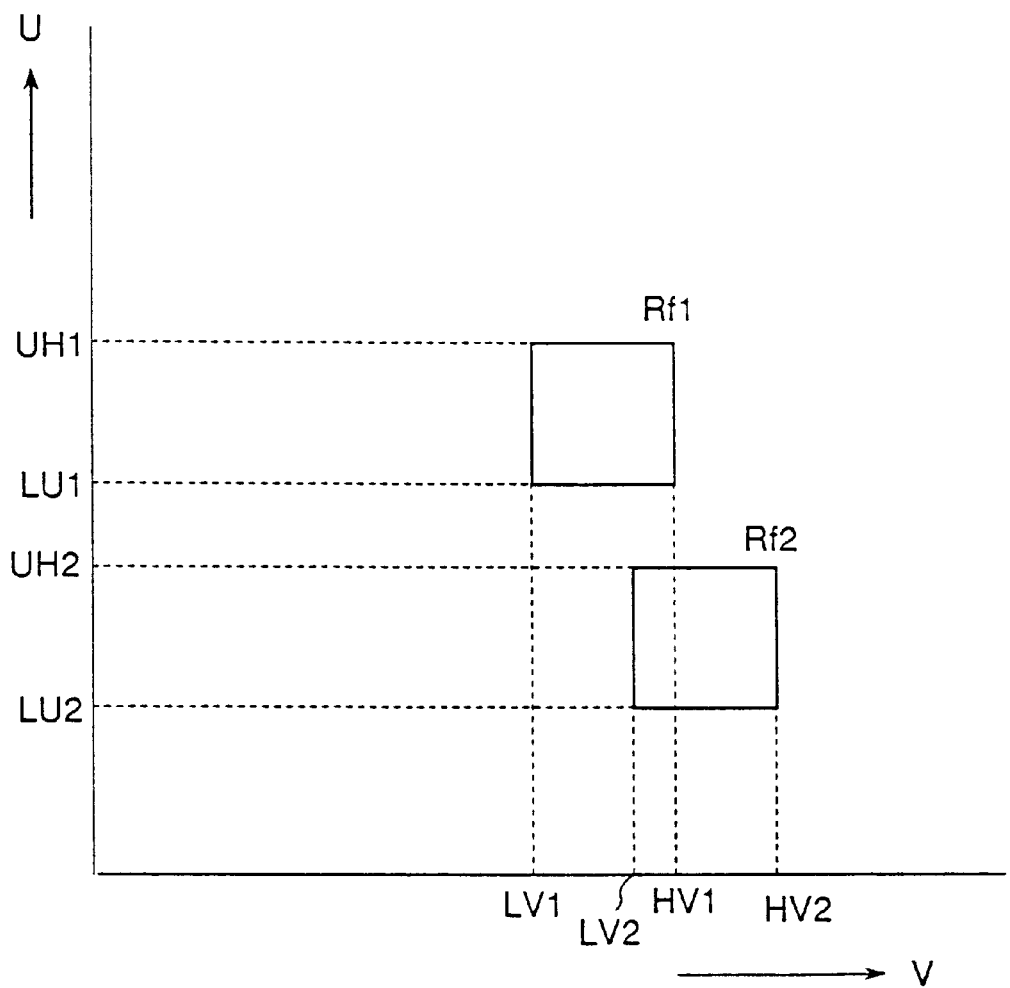
FIG. 4 is a view for explaining a conventional image processing.

Similar techniques for determining the above-mentioned two-dimensional histogram of parameters H and S and dividing and extracting peaks corresponding to respective areas of an image are also proposed in Japanese Laid-Open Patent Publication Nos. 6-160993, 6-67320, 5-158164, 5-100328, 4-346334, 4-346333 and 4-346332. Another (second) example of a conventional area-extracting method is as follows:

FIG. 4 shows a two-dimensional histogram plotted for color difference values U and V, where a face area is included in area Rf1 or Rf2. Therefore, the area Rf1 defined by LU1<U<UH1 and LV1<V<HV1 or the area Rf2 defined by LU2<U<UH2 and LV2<V<HV2 is extracted and outputted as a face area. The above-mentioned processing is conducted on all video frames.

Referring now to the accompanying drawings, preferred embodiments of the present invention will be described in detail as follows: (Embodiment of the present invention, which corresponds to aforementioned (1), (2), (5) or (6))

In this embodiment, hue is used as a color component having little correlation with a luminance component. Although there are many equations usable for deriving a value of hue from an image, this embodiment adopts a hue-deriving equation according to a standard HSV color representation system (H- hue, S- Saturation, V-Luminance). The following equation (1) is an example of hue (H-value) deriving equation for an input format of an RGB signal.

$$H = \cos^{-1}\left[\frac{(R-G)+(R-B)}{2\sqrt{\{(R-G)^2+(R-B)(G-B)\}}}\right] (H = 2\pi - H, \text{ if } B > G) \quad (1)$$

Figure 5:
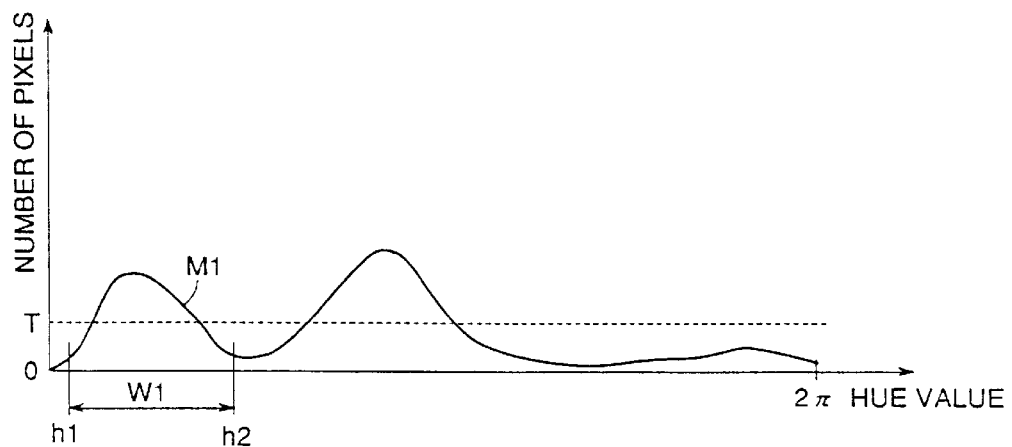
FIG. 5 is a graph of histogram of a hue values of the white race and the yellow race.
Figure 6:
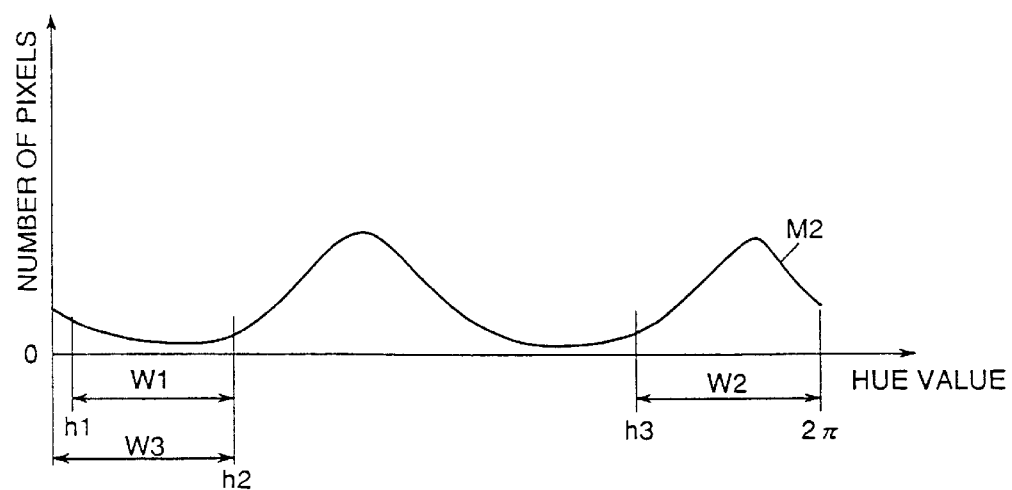
FIG. 6 is a graph of histogram of a hue values of the black race.

FIGS. 5 and 6 show histograms of hue values derived from an image including a face area according to Equation (1). In FIG. 5, there is shown a histogram obtained from an image including therein a person with a relatively thin colored skin such as the white or yellow. In FIG. 6, there is shown a histogram obtained from an image including a person having a relatively thick colored skin such black.

In FIG. 5, pixels of a skin-color area are usually distributed in a ridge (peak) M1 of the histogram. Namely, pixels representing a skin color exist in a range W1 in which hue value takes 0.15 to 0.45 rad. On the other hand, the histogram of FIG. 6 shows no ridge of frequency (pixels) in the range W1, that is, no skin-color area exists within the hue value range W1. The skin-color area is distributed in a ridge M2 of the histogram, which ridge lies within a range W2 of hue values.

Figure 7:
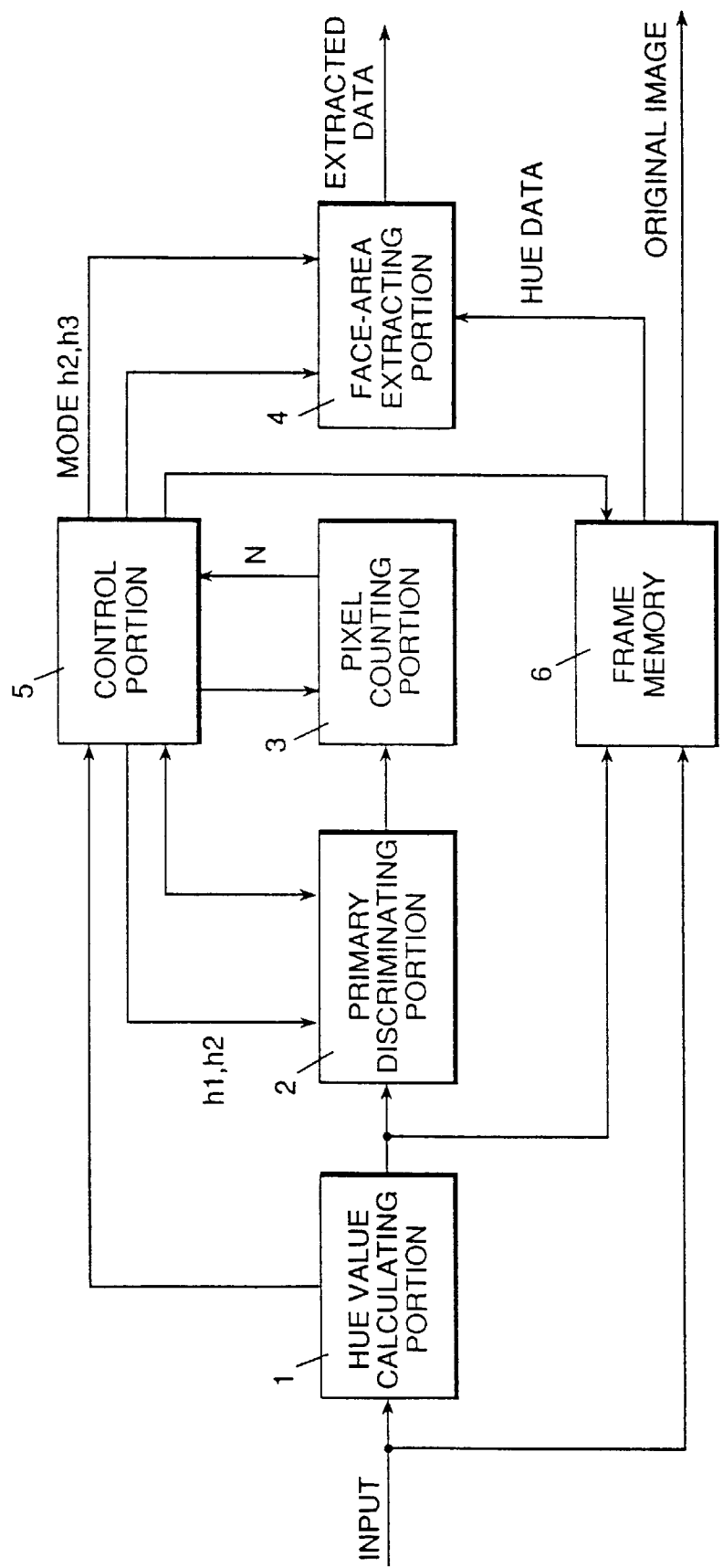
FIG. 7 is a block diagram showing an embodiment of the present invention, which embodiment relates to realizing a specified image area extracting method.

FIG. 7 is a block diagram showing an apparatus for realizing an area extracting method according to the present invention. The operation of the apparatus is as follows:

A hue value calculating portion 1 determines a hue value from an input video signal according to Equation (1). Derived hue data together with the input video signal is recorded into a frame memory 6 and then is outputted to a primary discriminating portion 2.

The primary discriminating portion 2 determines a specified range W1 defined by an upper limit value h2 and a lower limit value h1 outputted from a control portion 5 and extracts pixels whose hue values determined by the hue value calculating portion 1 lie within the range W1. In this case the upper limit h2 and the lower limit h1 may take constant (fixed) values. Usually, h1 is set at 0.15 rad and h2 at 0.45 rad. The extraction result is outputted to a pixel counting portion 3.

The pixel counting portion 3 counts the number of pixels extracted by the primary discriminating portion 2. The counted value is outputted to a control portion 5.

The control portion 5 decides to which group (thick or thin) the extracted person's skin color belongs according to the counted pixel value and decides, on the basis of the above-mentioned discrimination, a range of color component values to be used for further area-extraction.

A mode representing the decided color range together with a threshold value is outputted to a face-area extracting portion 4.

Figure 8:
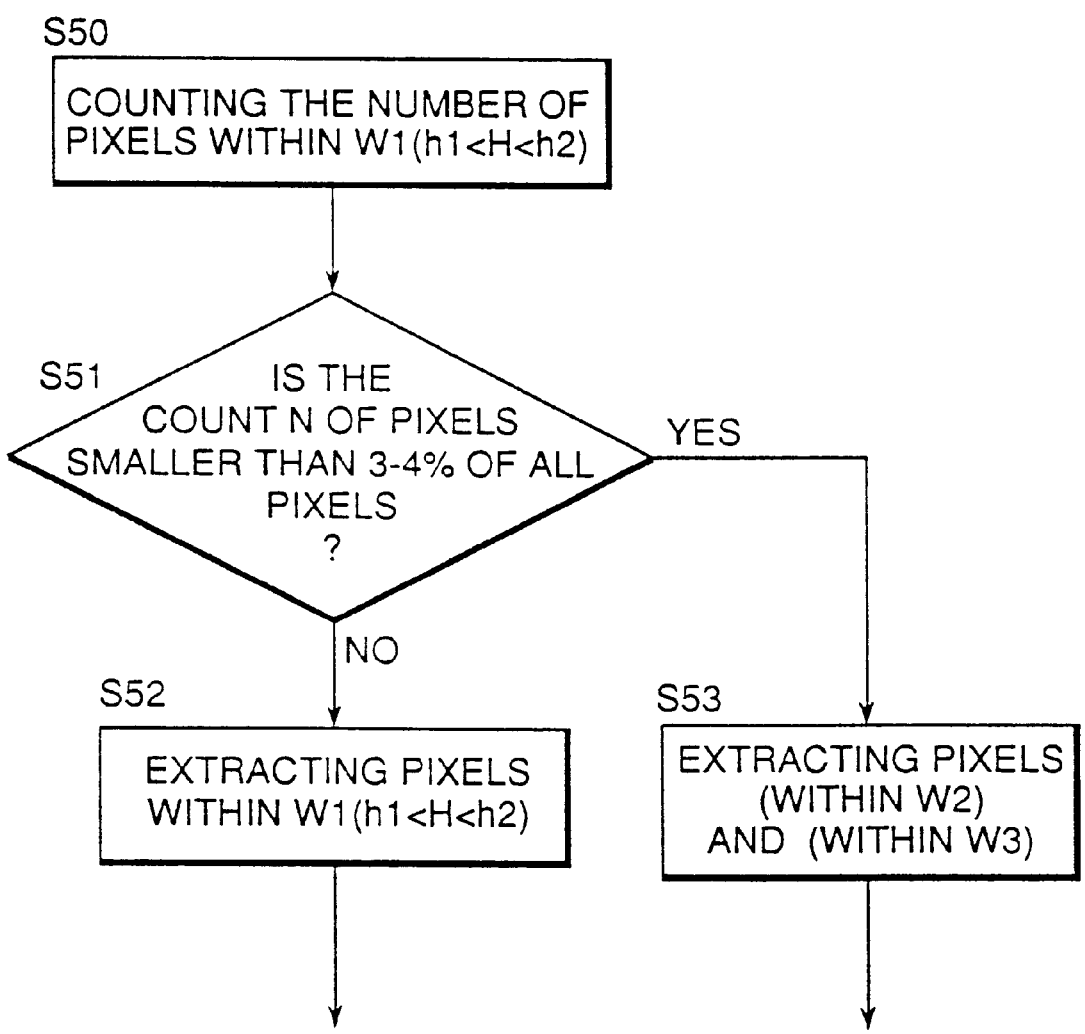
FIG. 8 is a flow chart showing sequential operations of a control unit of an embodiment shown in FIG. 7.

FIG. 8 shows a sequence of operations of the control portion 5 when deciding a color area. At Step S50, a count value N is obtained. At Step S51, a proportion of a face area to an entire image is estimated at 3 to 4% of a total of pixels. In this case, the extractable person is considered to have a thin skin-color if the counted value exceeds the estimated value. At Step S52, a color component area W1 within h1<H<h2 is decided as a specified area. On the contrary, the person is considered to have a thick skin color if the counted value does not exceed the threshold. In this case, at Step S53, a logical sum of color areas W2 and W3 defined by h2 and h3 from the control portion 5 is determined as a specified area. Generally, h3 is set at 6.0. The area W2 is h 3<H≦2π and the area W3 is 0<H<h2. As Equation (1) for deriving a hue value is defined by an inverse cosine, the two areas W2 and W3 have hue values being successive to each other at 2π and zero to form a substantially single area. In the face-area extracting portion 4, a face (skin-color) image area according to the threshold value and the mode outputted from the control portion 5 is extracted as, e.g., an address for a hue signal read from the frame memory 6.

Figure 9:
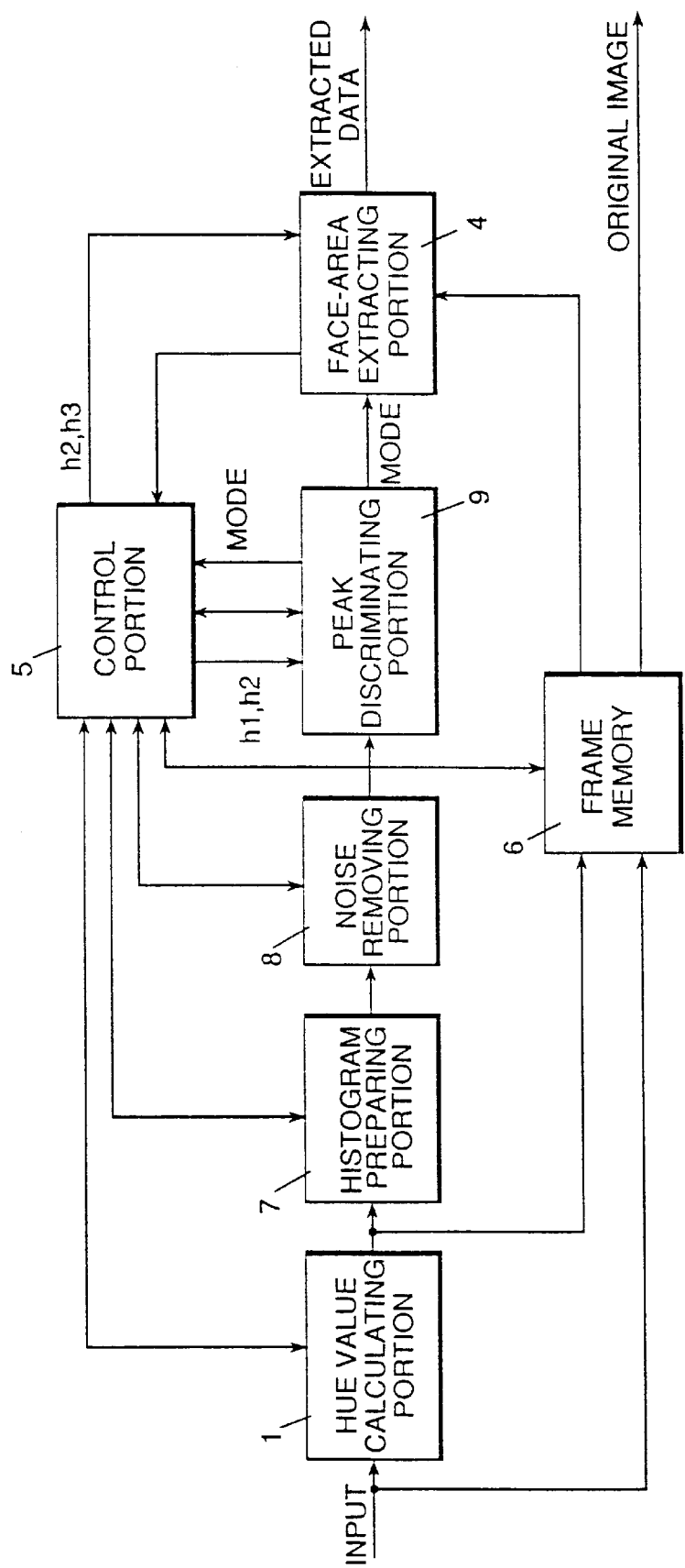
FIG. 9 is a block diagram showing hardware realizing a method of the present invention.

Embodiment of the present invention, which corresponds to aforementioned (1) to (4):

FIG. 9 is a block diagram showing another example of an apparatus for realizing the present invention. The operation of the apparatus is as follows:

This embodiment differs from the aforementioned first embodiment by using a histogram preparing portion 7, a noise eliminating portion 8 and a peak detecting portion 9 in place of the primary discriminating portion 2 and the pixel counting portion 3 of the first embodiment.

The histogram preparing portion 7 prepares a histogram of hue values. The histogram may include noise and calculation error components. To eliminate these erroneous components, the noise eliminating portion 8 conducts smoothing of histogram by using, e.g., a median filter and then cuts off a histogram part whose frequency (the number of pixels) is not more than a value T as shown in FIG. 5. The thus obtained histogram is outputted to the peak discriminating portion 9.

The peak discriminating portion 9 examines whether the histogram has a peak in a specified area W1 (this is the same as described before with reference to FIGS. 5 and 6). The examination result is outputted to a control portion 5.

According to the examination result, the control portion 5 correlates the histogram with a color area of a person with a thin skin-color (i.e., of the white race or the yellow race) if a peak was found in the area W1, or with a color area of a person with thick skin color (i.e., of the black race) if no peak was found therein. Similarly to the case of first embodiment, the control portion 5 outputs a decided color-area mode and a threshold to a face-area extracting portion 4. The face-area extracting portion 4 extracts a face (skin-color) area from a hue signal of an image read from a frame memory according to the mode and the threshold received from the control portion 5.

Embodiment of the present invention, which corresponds to aforementioned (7) to (9):

The following description relates to an embodiment of the present invention, which functions not with a edited image (e.g., a movie picture) but with non-edited images taken by a camera. Images of this type allow extraction of respective face-areas therefrom by using the same threshold as far as the same person exists in the images. This embodiment is intended to use the above-mentioned feature.

Figure 10:
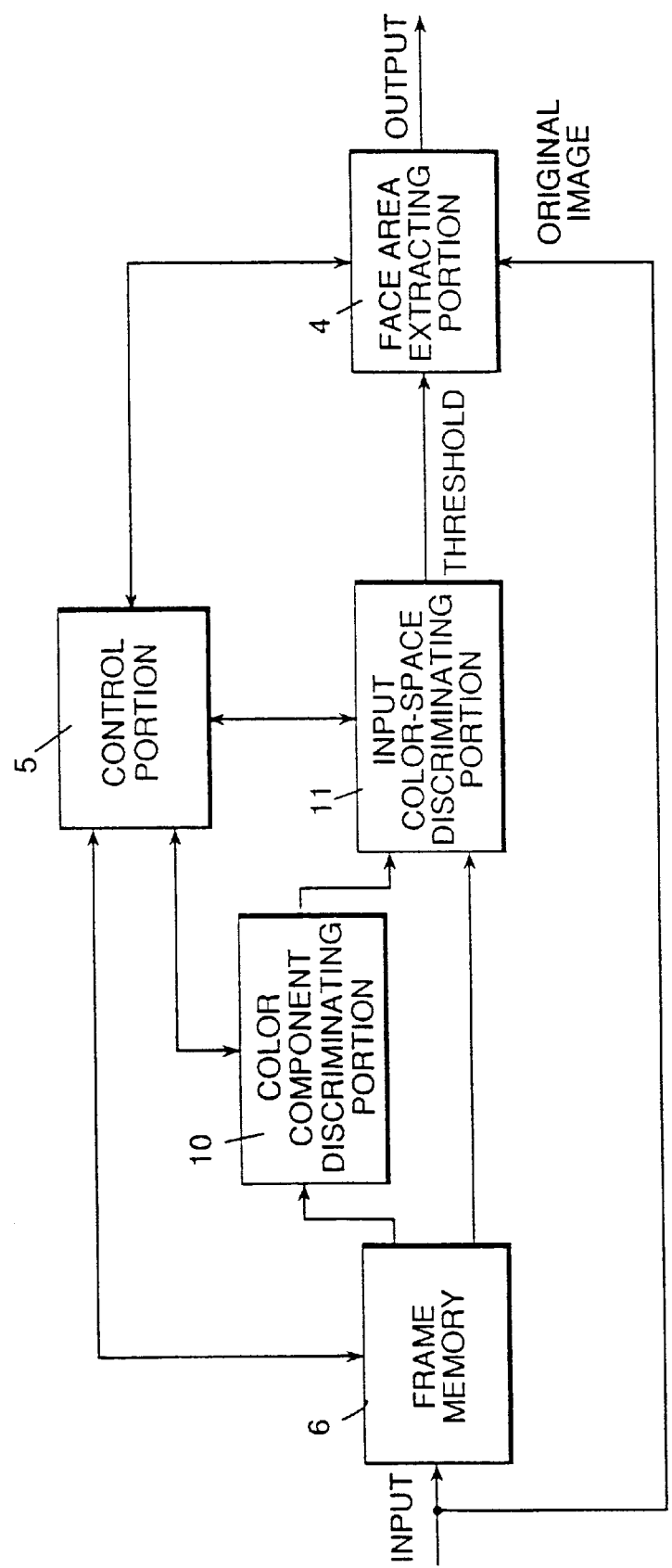
FIG. 10 is a block diagram showing an image processing device embodying the present invention.

FIG. 10 is a block diagram showing an apparatus for realizing the present invention. The operation of the apparatus is as follows:

A frame memory 6 stores a frame of an input original image.

A color component discriminating portion 10 discriminates a face area in the frame of the original image read from the frame memory 6 according to a color component value. The discrimination can be made, for example, by using the face-area extracting method described in the first embodiment of the present invention defined in the above (1) to (4). The discrimination result is outputted to an input color-space discriminating portion 11.

The input color-space discriminating portion 11 extracts data corresponding to the same co-ordinates as those of pixels which were judged by the color-component discriminating portion 11 to be the pixels of a face area of the original image read from the frame memory 6. The portion 11 then prepares a histogram in an input color-space by using the extracted data. For example, with the input format of RGB signals, the portion prepares three histograms for respective primary colors (Red, Green and Blue).

A face area of the input original image in the color space is discriminated by detecting peaks (frequency distributions) above a noise level in respective histograms, and a threshold for the face area in the input color space is determined. The obtained threshold is outputted to a face-area extracting portion 4.

A control portion 5 instructs the face-area extracting portion 4 to output an original image without processing until it receives a threshold value from the input color-space discriminating portion 11. The control portion 5 controls the face-area extracting portion 4 to extract a face area from the original image as soon as the threshold value was outputted to it. It requires, for example, one second to obtain the threshold: one second corresponds to a duration of 30 video frames. To achieve real-time face-area extraction processing, the control portion 5 therefore instructs the face-area extracting portion 4 to output 30 successive frames of the original image without any processing and extract a face-area from the 31st and proceeding frames as shown in FIG. 11. This method can reduce processing time to 1/30 in comparison with the case of extracting a face-area by determining a threshold for each video-frame. Consequently, hardware for determining threshold values may be simplified and can be controlled by a microprocessor.

The face-area extracting portion 4 under the control from the control portion 5 outputs an original image without processing or extracts a face area from the original image according to the threshold given from the input color-space discriminating portion 11.

The above-described embodiment determines a threshold for 1 frame of video and extracts a face area from each of successive images by applying the same threshold. However, in applying this method to visual telephones and video-conferencing apparatus, it must be considered that a person may alternate with another person in the middle of communication, whereby erroneous extraction may occur.

To avoid this, a threshold obtained by the above-mentioned method is used for face-area extraction but is updated at an interval of the specified number of frames (e.g., once every 300 frames) for further face-area extraction. In other words, the above-mentioned embodiment is repeated periodically with updating the threshold value.

It is supposed that a time necessary for obtaining a threshold value corresponds to a duration of N1 successive frames, a current threshold value may be updated periodically once every N2 frames (N2>N1). In this case, the control portion 5 instructs the frame memory 6 to record frame No. 0, frame No. N2, frame No. 2×N2. . . frame No. n×N2 (n is an integer) as shown in FIG. 12. In processing frames 0 to N1, a threshold T1 is determined by the above-mentioned method, then a face-area is extracted from frames N1+1 to N2+N1 by using the threshold T1. Meanwhile, a frame No. N2 is recorded into the frame memory 6 and processed to obtain therefrom a threshold T2. The frames No. N2+N1+1 to 2×N2+N1 are then processed for extracting therefrom a face area by applying an updated threshold T2. The same cycle of processing will be repeated.

As is apparent from the foregoing, the present invention offers the following advantages:

(1) It is possible to provide for extracting a face (skin-color) area with minimized error irrespective of the races.

(2) It is possible to provide an effective technical apparatus for practical use realizing the above (1).

(3) It is possible to provide an effective apparatus for extracting a specified image area by preparing a histogram and detecting peaks thereof within a specified area.

(4) It is possible to further simplify said area-extraction processing by fixing the specified range.

(5) It is possible to provide an apparatus capable of extracting two specified image areas on the basis of a sum of counted pixels having a color component value within a specified range. This enables automation of the specified image-area extraction.

(6) It is possible to further simplify the above-mentioned processing by fixing the specified range.

(7) It is possible to propose to extract pixels of a specified range from only one frame according to the specified color component value, convert the color component value of the extracted pixels into a color-space value, obtain a threshold value therefrom and perform processing operations on the succeeding frames by using the obtained threshold value. This can realize a considerable timesaving of the process as compared with the case of extracting a specified area from every frame by using respective color component values obtained for respective frames.

(8) it is possible to provide a feature of periodically updating a threshold value in addition to the invented feature of the above (7). This feature makes it possible to accurately extract a specified image area even with variation of an object matter in a series of images and to respond the case when persons alternate in a sequence of frames.

(9) In addition to the effects of the above (7) and (8), it is possible to realize enough capability to process a sequence of video frames. This can solve the problem of the conventional systems that can not work with a sequence of video frames.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A specified image-area extracting method comprising the steps of:
   a) deriving a value of a color component having low correlation with luminance from each pixel of an input colored image;
   b) determining distributions of all pixels of the input colored image according to every color component value;
   c) determining a specified area of each color component value in the input colored image based on the determined distributions; and
   d) extracting a pixel whose color component value belongs to the specified area.

2. The specified image-area extracting method as defined in claim 1, wherein hue is used as the color component.

3. The specified image-area extracting method as defined in claim 1, wherein said step b) comprises:
   b1) preparing a histogram of the color component values; and
   b2) determining existence of a peak having a frequency exceeding a preset value in a preset range of values of the color component,
   two specified preset areas being selected for determining in said step c) based on the determination in said step b2).

4. The specified image-area extracting method as defined in claim 3, wherein the preset range of the color component values is limited by a fixed upper limit value and a fixed lower limit value.

5. A specified area extracting device comprising:
   arithmetic processing means for determining a color component value having low correlation with luminance for each pixel in an input colored image;
   a frame memory for storing the input colored image and the color component value determined by said arithmetic processing means;
   discriminating means for discriminating whether the determined color component value is included within a preset specified range of color components values;
   counting means for counting the number of pixels in the input colored image having a color component value within the preset specified range according to the discrimination by said discriminating means;
   specified image-area extracting, means for extracting an image within the preset specified range of color component values from said frame memory; and
   control means for controlling said arithmetic processing means, said discriminating means, said counting means and said specified image-area extracting means, said control means comparing a count value of said counting means with a preset value and selecting two specified ranges of the color component values as the preset specified range extracted by said specified image-area extracting means based on the comparison.

6. The specified area extracting device as defined in claim 5, wherein an upper limit value and a lower limit value limit the preset specified range of color component values, the upper limit value and the lower limit value being constant values.

7. A specified area extracting device comprising:
   a frame memory for storing an input colored image;
   pixel extracting means for deriving a color component value having low correlation with luminance for each pixel of the input colored image stored in said frame memory, determining distributions of all pixels of the input colored image according to the color component values, determining a specified area of the color component values in the input colored image based on the distributions, and extracting pixels of the input colored image belonging to the determined specified area;
   first means for preparing a histogram of the extracted pixels in an input color space;
   second means for determining a specified area in the input color space from distributions of the prepared histogram;
   third means for applying the determined specified area to an input image of a proceeding frame and extracting pixels belonging to the determined specified area from the input colored image; and
   control means for controlling said pixel extracting means and said first, second and third means.

8. The specified area extracting device as defined in claim 7, wherein said control means periodically controls determination of the specified area in a color space and extraction of pixels belonging to the determined specified area by repeatedly applying the determined specified area to inputted images until a new specified area is determined.

9. The specified area extracting device as defined in claim 7, further comprising input processing means for processing an image sequence to be used as the input colored image.

10. The specified area extracting device as defined in claim 8, further comprising input processing means for processing an image sequence to be used as the input colored image.

11. An apparatus for extracting, a specific area from an image comprising:
   color component determination means for determining hue values for each pixel of the image;
   discriminating means, coupled to said color component determination means, for designating a specific range of the hue values and extracting pixels from the image having hue values determined as within the specific range;
   counting means, coupled to said discriminating means, for counting a number of pixels extracted by said discriminating means;
   control means, coupled to said counting means, for determining a range of hue values for area extraction based on the counted number of pixels; and
   area extracting means, coupled to said control means, for extracting a specific area of the image having hue values within the determined range of hue values.

12. The apparatus for extracting a specific area from an image of claim 11, wherein said discriminating means designates the specific range in accordance with a predetermined fixed upper limit and a predetermined fixed lower limit of the hue values.

13. The apparatus for extracting a specific area from an image of claim 11, wherein said control means determines the range of hue values as one of a first range and a second range in accordance with the counted number of pixels.

14. An apparatus for extracting a specific area from an image comprising:
   color component determination means for determining hue values for each pixel of the image;
   histogram means, coupled to said color component determination means, for preparing a histogram of the hue values;

noise removing means, coupled to said histogram means, for smoothing the histogram by eliminating portions of the histogram having a frequency less than a predetermined value;

discriminating means, coupled to said noise removing means, for designating a specific range of the hue values in the smoothed histogram and detecting whether a histogram peak is within the specific range;

control means, coupled to said discriminating means, for designating a color extraction mode and a threshold for area extraction based on histogram peak detection by said discriminating means; and area extracting means, coupled to said control means, for extracting a specific area of the image in accordance with the designated color extraction mode and the designated threshold.

15. The apparatus for extracting a specific area from an image of claim 14, wherein said discriminating means designates the specific range in accordance with a predetermined fixed upper limit and a predetermined fixed lower limit of the hue values.

16. A specified image-area extracting method comprising the steps of:

a) deriving a value of a color component having low correlation with luminance from each pixel of an input colored image, the input colored image being a colored image of its skin of a living being;

b) determining distributions of all pixels of the input colored image according to every color component value;

c) determining a specified area of each color component value in the input colored image based on the determined distributions; and d) extracting a pixel whose color component value belongs to the specified area.

17. The specified image-area extracting area extracting method of claim 1, further including the step (e) forming a color video image for video communication.

18. A specified area extracting device comprising:

arithmetic processing means for determining a color component value having low correlation with luminance for each pixel in an input colored image, wherein the colored image being a colored image of the skin of a living being;

a frame memory for storing the input colored image and the color component value determined by said arithmetic processing means;

discriminating means for discriminating whether the determined color component value is included within a preset specified range of color component values;

counting means for counting the number of pixels in the input colored image having a color component value within the present specified range according to the discrimination by said discriminating means;

specified image-area extracting means for extracting an image within the preset specified range of color component values from said frame memory; and control means for controlling said arithmetic processing means, said discriminating means, said counting means and said specified image-area extracting means, said control means comparing a count value of said counting means with a preset value and selecting two specified ranges of the color component values as the present specified range extracted by said specified image-area extracting means based on the comparison.

19. The specified extracting device according to claim 1, further including means for video communicating a color video image.

* * * * *